July 29, 1969 X. VOGEL 3,458,672

WITHDRAWAL ELECTRICAL SWITCHING APPARATUS

Filed Aug. 7, 1967

INVENTOR.
Xaver Vogel
BY
Pierce, Scheffler & Parker
Attorneys

United States Patent Office 3,458,672
Patented July 29, 1969

3,458,672
WITHDRAWAL ELECTRICAL SWITCHING APPARATUS

Xaver Vogel, Wettingen, Switzerland, assignor to Aktiengesellschaft Brown, Boveri & Cie., Baden, Switzerland, a joint-stock company Filed Aug. 7, 1967, Ser. No. 658,810
Claims priority application Switzerland, Sept. 23, 1966, 13,784/66
Int. Cl. H01h 9/20
U.S. Cl. 200—50 4 Claims

ABSTRACT OF THE DISCLOSURE

Electrical switching apparatus comprising a housing containing a switching device such as a thyristor and a control device therefor includes a pair of screws for attaching the housing and simultaneously electrically connecting the thyristor to a bus bar system. The screw heads are accessible only through openings provided in a plate which is normally held in a position such that the screw heads are out of alignment with the openings, and a screw which holds the plate against displacement is located behind the plug of a plug-and-socket connection for the control device. Only by removing the plug, which then electrically disconnects the control device of the thyristor, can the plate holding screw be reached for loosening so as to enable the plate to be shifted to a position wherein the plate holes are aligned with the screw heads thus enabling one to insert a tool through the holes and unfasten the attachment screws.

Figure 1:
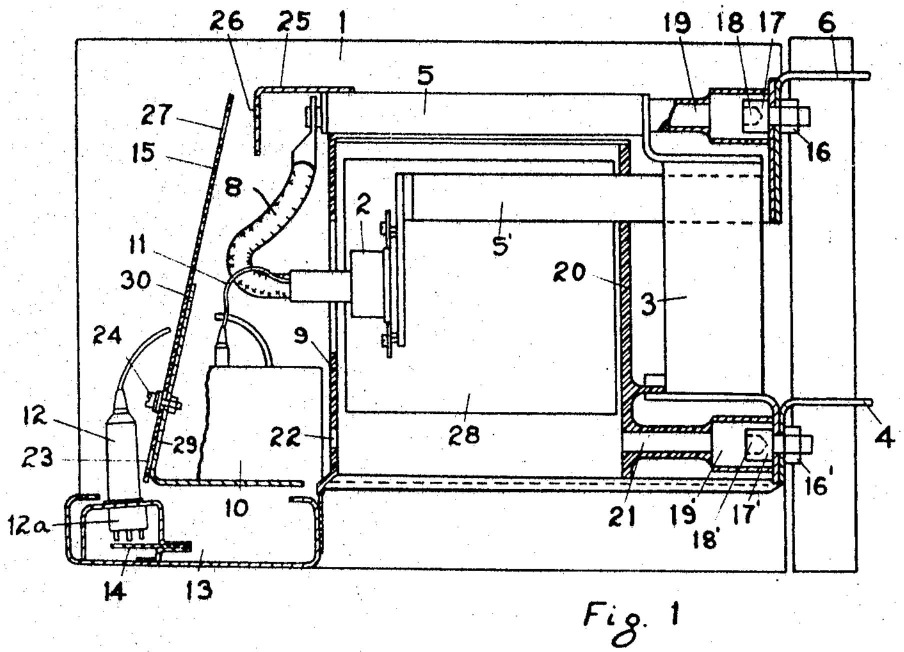

This invention relates to electrical switching apparatus in which the heavy-current components and the control and indicating devices are arranged in a withdrawable housing, the heavy-current components being connected to the stationary part of the switch apparatus by screw connections, whereas the control and indicating devices are connected to the stationary part of the switch apparatus by plug and socket connections.

Switch apparatuses of this type, which can be used in particular for the insertion of thyristor elements with the associated control devices and safety devices, are frequently constructed in the form of drawers which can be withdrawn from a frame, plugs being provided at the rear of the drawers for connection with the rest of the switch apparatus. It is necessary to ensure that the plugs are disconnected only in the currentless state, which means that locking devices have to be provided, these being made dependent on the position of the associated switches. This arrangement, however, is complicated. With very high currents, the plug contact places can become undesirably overheated. Moreover, the plugs are so constructed that contact pressure is ensured even at maximum current and, accordingly the withdrawal of the drawers can be accomplished only by the application of great force.

In particular with thyristor arrangements for comparatively high currents, screw connections are preferred. However, since the screw connections must be arranged at the rear of the apparatus, it is difficult to gain access to them and, before unscrewing, the voltage must be removed from the whole apparatus. In thyristor installations, the thyristors are frequently connected in series with fuses or other safety devices, which form part of the heavy-current equipment and must therefore be protected against contact. If the fuses are put at the rear, it becomes difficult to exchange them. If, however, they are put at the front, the control devices and control supply located there must not prevent their withdrawal, and protection against contact must be provided. An attempt has been made to put the control lines and the associated devices at the rear of the apparatus, and the safety devices in front, but the accessibility of the control lines is jeopardized.

In order to overcome these disadvantages, I provide electrical switching apparatus in which heavy-current equipment and control devices are arranged in a withdrawable housing. The heavy-current equipment is disposed in the rear part of the housing and is connected to a stationary part of the apparatus such as a bus bar system by screw connections in the rear part of the housing. The control device is connected to a stationary part of the apparatus by plug and socket connecting means. The control device with its connecting means is located in the front part of the housing. An insulating wall is provided between the heavy-current equipment and the front part of the housing in which wall there are openings which are axially aligned with the screw connections. A displaceable wall is disposed in front of the insulating wall at said front part, which wall is provided with openings and can be displaced between a first position in which its openings are axially aligned with the screw connections and a second position in which its openings are not so aligned. Means are provided for fixing the displaceable wall to the housing in the second position of the wall, access to the fixing means being normally prevented by the plug-and-socket connecting means, so that the fixing means can be released and the wall displaced to its first position only after disconnection of the plug-and-socket connecting means, the screw connections being accessible to a tool inserted through the openings in the walls only when the displaceable wall is in its first position.

Thus, by means of an insulated tool operated through the openings in the walls, the screw connections at the rear can be unscrewed independently of the voltage state of the apparatus.

Figure 2:
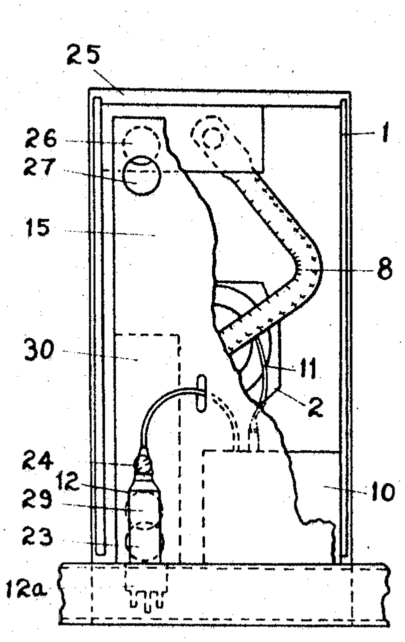

FIGURES 1 and 2, of the accompanying drawing show an example of the invention as applied to thyristor switching apparatus.

FIGURE 1 is a side view showing the interior of the housing for the apparatus, with certain parts shown in section, and FIGURE 2 is a front view showing the interior of the housing with certain parts cut away.

A housing, consisting, for example, of insulating material, in which thyristors with their control devices are installed, is shown at 1. One terminal of a thyristor 2 is connected via a cable 8, rigid strap 5 and fuse 3 or other safety device to a bus-bar 4. The other terminal of this thyristor, at its base, is connected via rigid strap 5' to another bus-bar 6. The heavy equipment, namely, thyristor 2, fuse 3, straps 5 and 5' and bus-bars 4 and 6, is isolated by a wall 9 of insulating material from the control portion of the apparatus arranged inside a separate casing 10. The control lead to the thyristor from casing 10 is indicated at 11, the control equipment being supplied with its electrical power by way of a removable plug 12 and a socket **12*a* type of connection from a cable channel 13 and terminal strip 14**.

Bus-bars 4 and 6 are each connected to the withdrawable switch apparatus by means of a screw connection, each such connection consisting of a nut 16, 16' welded onto the bus-bar strip, and a screw 17, 17' into the head of which a square or hexagonal recess 18, 18' is provided, and into which an insulated tool, for instance an "Allen" wrench, can be inserted to tighten or release the screw. Access to the screws from the front is as follows: the head of each screw 17, 17' is arranged in a sleeve 19, 19' which is fixed to a rear wall 20 also made of insulating material; wall 20 has an opening 21 in alignment with the lower sleeve 19'; the wall 9 has a corresponding opening 22 in alignment with opening 21, through which the tool can be inserted to reach the head of screw 17'. The opening 22 is provided on the left alongside the control chamber 10. At the front of the housing 1 there is an insulating wall 15 providing protection against contact with cable 8, which likewise has an opening 23, the axis of which is, however, normally lower than the axes of the remaining openings 21, 22. Therefore, when wall 15 is in the position shown, the tool cannot be inserted into sleeve 19'. The wall 15 is fixed by a screw 24 to a bracket 30, which has an opening 29 aligned with openings 22 and 21. When 24 is loosened, wall 15 can be displaced upwardly, so that the opening 23 comes into alignment with the other openings 29, 22 and 21. It is then possible to unscrew the lower screw 17' by means of the tool. The screw 24 can only be released when the plug 12 has been withdrawn, since plug 12 in its socket is placed immediately in front of screw 24; by the withdrawal of the plug, the control is, however, disconnected, and the thyristor becomes dead, thus making it safe to remove the switch apparatus from the bus-bars.

Similarly, the upper sleeve 19 and head of screw 17 are aligned with an opening 26 in a stationary cover 25. Opening 26 is normally covered by the wall 15. The said wall has an opening 27, which when the apparatus is switched on is not aligned with opening 26, the position shown in the drawing. Only after the unscrewing of the screw 24 and the displacement upwardly of wall 15 are the openings 26 and 27 aligned, so that then the upper screw connection 17 can also then be unscrewed. The screws 17, 17' in this arrangement are captive by virtue of reduction in diameter of the front parts of sleeves 19, 19' which also serve as guides for the tool.

Walls 9 and 20 lie respectively in front of the and behind thyristor 2, which has cooling surfaces 28 of a known type. Cooling air can be supplied from below in a known manner and conveyed between the walls 9 and 20 so as to pass in heat transfer relation with the cooling surfaces 28.

The advantage of the arrangement is that it is very easy to inspect the assembly of heavy-current equipment and its control portions, the connections being capable of carrying heavy currents, yet being simply releasable with application of a slight force. Nevertheless, complete security against contact with the heavy-current portions is provided. Loosening or release can be effected quite simply, without additional locking devices, in the dead state. Release can be effected while the bus-bars are under voltage, as the tool itself is insulated.

The housing and protective walls can, for example, be made of plastics material.

I claim:

1. Electrical switching apparatus comprising a removable housing, hevay current equipment such as a thyristor mounted in the rear part of said housing, a control device for said thyristor mounted in the front part of said housing, a pair of fastening screws at the rear part of said housing for electrically and mechanically connecting said thyristor and said housing in place to bus bars supplied with energy by said thyristor, a plug and socket type of connection for said control device including a removable plug connected to the control device and a stationary socket, a stationary electrically insulating wall located between said thyristor and the rear part of said housing, said stationary insulating wall having openings therethrough in axial alignment with the heads of said fastening screws, a displaceable wall disposed in front of said stationary wall, said displaceable wall being provided with spaced openings and being movable between a first position in which the openings therein are axially aligned with the openings in said insulating wall and a second position in which the openings are out of alignment with said openings in said insulating wall, and releasable fastening means securing said displaceable wall in said housing in said second position, said fastening means being located behind said removable plug and hence accessible from the front for release only when said plug has been removed thereby to disconnect said control device from said thyristor, the heads of said fastening screws being accessible to a tool inserted through the aligned openings in said insulating and displaceable walls respectively only when said displaceable wall has been shifted to said first position.

2. Electrical switching apparatus as defined in claim 1 and which further includes guide sleeves mounted in said housing in alignment with said openings in said stationary insulating wall for guiding a tool to the heads of said fastening screws.

3. Electrical switching apparatus as defined in claim 1 and which includes a second stationary insulating wall having an opening therein in axial alignment with one of the heads of said fastening screws and said thyristor is located intermediate said stationary insulating walls.

4. Electrical switching apparatus as defined in claim 1 where in the walls of said housing and said stationary and displaceable wall are made from a plastic material.

References Cited

UNITED STATES PATENTS 2,914,635 11/1959 Lester et al. ---- 200—50.15 XR

ROBERT K. SCHAEFER, Primary Examiner

M. GINSBURG, Assistant Examiner

U.S. Cl. X.R.

217—103